3,829,520
INHIBITION OF OLEFIN ISOMERIZATION AND REVERSE DISPLACEMENT IN CATALYTIC DISPLACEMENT REACTIONS
Ralph T. Ferrell, Ponca City, Okla., assignor to Continental Oil Company, Ponca City, Okla.
No Drawing. Filed May 15, 1972, Ser. No. 253,209
Int. Cl. C07c 11/24
U.S. Cl. 260—677    9 Claims

ABSTRACT OF THE DISCLOSURE

Isomerization and reverse displacement reactions are inhibited in producing α-olefins by catalytic displacement from aluminum alkyl growth product using carbon monoxide. Briefly, carbon monoxide is injected into the displacement reaction product mixture prior to separation of the aluminum alkyls.

DISCLOSURE

This invention relates to the production of α-olefins by catalytic displacement from aluminum alkyl growth products wherein reverse displacement and isomerization of the olefins are inhibited.

It is generally known that olefins may be produced by displacement reactions involving aluminum alkyl growth products which have been formed by reacting a trialkylaluminum compound with a lower olefin, e.g., ethylene. This reaction, as applied to triethylaluminum and ethylene, may be illustrated equation-wise as follows:

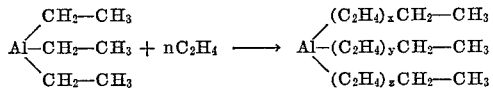

wherein $x$, $y$ and $z$ are 0 or integers, the sum of which is equal to $n$. The average number of lower olefin units added to the aluminum trialkyl compounds may be controlled as is known in the art.

The olefins may be produced from the above-described growth product by thermal or catalytic displacement reaction. In general, the reaction involves reacting a low molecular weight olefin with the growth product to displace the higher olefin and may be illustrated equation-wise as follows:

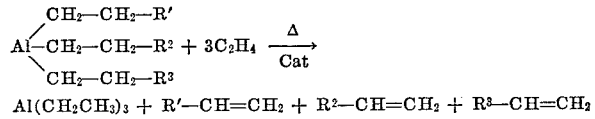

$Al(CH_2CH_3)_3 + R'—CH=CH_2 + R^2—CH=CH_2 + R^3—CH=CH_2$

Catalytic displacement is generally preferred over thermal displacement for a variety of reasons, among which is the ability to conduct the reaction at lower temperatures. However, one of the disadvantages associated with catalytic displacement reactions is the tendency for the α-olefins to isomerize to internal olefins during and after reaction, apparently due to the presence of aluminum alkyls and possibly the displacement catalysts. Another disadvantage is the tendency for the displaced higher α-olefins to displace the lower olefins in what is referred to as a reverse displacement. These disadvantages in catalytic displacement reactions have been recognized in the art and various attempts have been made to overcome the problem. For example, in U.S. 2,978,523 it is suggested to use an acetylene alcohol in the displacement reaction to inhibit isomerization and reverse displacement. Furthermore, in U.S. 3,206,522 the addition of an alkali metal cyanide to catalytic displacement reaction is indicated as being effective in reducing isomerization and reverse displacement.

In accordance with this invention, another technique has been found for inhibiting isomerization and reverse displacement in producing higher α-olefins by a catalytic displacement reaction. Briefly described, the invention involves injecting carbon monoxide to a displacement product mixture containing α-olefins prior to inactivation or separation of the aluminum alkyls. Preferably, the carbon monoxide is injected while the displacement product mixture is still in contact with the displacing lower olefin.

The catalytic displacement reaction generally involves displacement of the alkyl radicals of the above-described growth products with a lower olefin in the presence of a displacement catalyst. Usually the reactions are conducted at moderate to elevated temperatures.

The growth products employed in the displacement reactions are those described hereinbefore wherein the pendant alkyl groups may have widely varying carbon contents. Generally, the major portions of the alkyl groups will have from about 2 to about 40 carbon atoms and more preferably from about 4 to about 30 carbon atoms. It should be understood, of course, that the chain lengths of the alkyl groups are not restricted to the above ranges and form no essential feature of this invention. Furthermore, growth products are known wherein the chain lengths of the pendant alkyl groups either form a Poisson distribution or a non-Poisson distribution, and it is pointed out that the improvement of this invention applies equally as well to olefins derived from either type of growth product.

The lower olefins employed to displace the pendant alkyl groups of the aluminum trialkyl growth products may be any low molecular weight mono-1-olefin usually having 2 to 6 carbon atoms. Preferably the displacing olefins will contain 2 to 4 carbon atoms with ethylene being the most preferred. Other olefins which may be employed would include propylene, butylene, isobutylene, pentene-1, 3-methylpentene-1, hexene-1 and the like having a terminal double bond. As is known in the art, the displacing olefin is normally employed in the displacement reaction in an excess of the stoichiometric amount based on aluminum trialkyl growth product. It has been suggested in U.S. 3,210,435 that up to about 30 mols of the displacing olefins per pendant alkyl group present in the aluminum trialkyl growth product may be employed. Alternatively, in U.S. 3,358,050 it has been suggested to use about 10 to 100 mol percent of the displacing olefins per mol of growth product. Either basis is suitable. While the prior art recognized the use of a substantial excess of displacing olefins during the displacement reaction, the reaction product was normally vented prior to any treatment of the reaction product or inactivation of the catalyst to enable separation of the olefin product from the aluminum alkyl. For example, in U.S. 3,499,057 ethylene is removed from the displacement reaction product for recycle prior to any treatment of the displacement reaction product such as with a complexing agent. Thus, when the displacing olefin was ethylene, a highly volatile normally gaseous olefin, the ethylene was substantially dissipated prior to any treatment of the reaction product or any inactivation of the catalyst.

The displacement catalysts employed in the displacement reaction are well-known in the art and include the so-called reduction catalyst such as nickel, cobalt, palladium and certain iron compounds. The preferred catalyst is nickel or a nickel compound which will react with the trialkylaluminum compound. As a lesser preferred catalyst, the choice is cobalt. Specific nickel catalysts would include finely divided metallic nickel, Raney nickel, nickel acetylacetonate, nickel naphthenate and the like. Ziegler has designated such catalysts in his work on this subject as "Colloidal" nickel catalyst. The amount of catalyst employed can be varied greatly as is well-known in the art. However, when employing the preferred catalyst, the amount used will generally vary from about 0.001 to about 0.1 percent based upon the weight of the aluminum trialkyl growth product.

It is sometimes desirable to employ a solvent or diluent in the displacement reaction. Suitable diluents should have a high atmospheric boiling point of the order of 280° F. or even higher. Illustrative of such diluents include the $C_9$ and higher paraffin hydrocarbons such as nonane, decane and dodecane; aromatic hydrocarbons; petroleum fractions of a suitable boiling range such as kerosene and naphtha; and the like.

In general, the displacement reaction is conducted by reacting the aluminum trialkyl growth product with the displacing olefin, such as ethylene, in the presence of the displacement catalyst, with or without a diluent, at temperatures in the range of about 100° F. to about 700° F. and pressures in the range of about 5 p.s.i.g. up to about 5000 p.s.i.g. or even higher. The pressure will usually be achieved through injection or otherwise charging of the displacing olefin, e.g., ethylene pressure. Higher pressures may be employed with the only real limit being one of practical consideration depending upon equipment, etc. Preferably, pressures of about 3 p.s.i.g. to 4000 p.s.i.g. are employed. Preferably, the reaction temperature will be in the range of about 100° F. up to about 300° F. with an optimal range from about 120° F. up to about 220° F. The resulting reaction product generally comprises a mixture of aluminum alkyls which include aluminum alkyls formed during the displacement reaction and also unconverted or partially converted aluminum alkyls as present in the original growth product together with a variety of α-olefin containing a range of carbon atoms corresponding to the pendant alkyl group of the starting aluminum trialkyl growth product. Of course, the excess displacing olefin will be present and a small quantity of internal olefin will usually also be present.

Now then, in accordance with the improvement of this invention, carbon monoxide is injected into the displacement reaction product prior to any inactivation or separation of the aluminum alkyls and preferably while still in contact with the excess displacing lower olefin which will usually be under reaction pressure. The carbon monoxide may be injected under its own pressure or it may be pressured in with the use of the displacing lower olefin. In general, the amount of carbon monoxide injected should be in the range of about 10 p.p.m. up to about 5000 p.p.m. based on the total displacement reaction product mixture, preferably in the range of about 100 p.p.m. to about 500 p.p.m. While some inhibition will be achieved with quantities less than 10 p.p.m., the benefits obtained are not regarded as being particularly significant. On the other hand, use of quantities of carbon monoxide much in excess of about 5000 p.p.m. may lead to undesirable side reactions wherein branched olefin dimers and trimers may be produced.

During or after the injection of carbon monoxide, the displacement reaction product mixture should be stirred so as to distribute the carbon monoxide throughout the displacement reaction product. Obviously, the best results will be achieved by obtaining as near a homogeneous mixture as possible. Some inhibition of the isomerization and reverse displacement will take place, of course, by mere contact between the materials but not to the degree that will take place when well-mixed.

After the carbon monoxide has been injected into the displacement reaction product mixture, the system may be depressurized to atmospheric pressure whereby the aluminum alkyl may be inactivated and/or separated from the α-olefins. Inactivation of the aluminum alkyls, if employed, may be accomplished by contacting the aluminum alkyls with a compound containing an active hydrogen, e.g., any Lewis base. Thus, the aluminum alkyls may be inactivated by contact with a mineral acid such as sulfuric acid, water, amines and the like. Complexing agents such as alkali metal cyanides as disclosed in U.S. 3,206,522 and linear Lewis base polymers as disclosed in U.S. 3,499,057 may be used. Additionally, the $R_nMX$ complexing agents disclosed in U.S. 3,280,025 (e.g., tetraalkyl ammonium halides) may be used. Sufficient complexing or inactivating agent should be added to completely inactivate the aluminum alkyls as may readily be determined by the art.

Once the aluminum alkyls have been inactivated by the addition of the complexing or inactivating agent, the mixture may be subjected to the usual recovery technique such as distillation. Oftentimes, depending upon the inactivating agent employed, the treated displacement reaction mixture will separate into an α-olefin phase and a phase containing aluminum alkyls. In this event, recovery of the α-olefins merely involves a phase split followed by a water and/or caustic wash and fractional distillation into the various chain length groups desired.

While the previous discussion indicates that the normal procedure will involve deactivation of the aluminum alkyls to recover the olefins, it is also within the concept of this invention to separate the aluminum alkyls from the olefins without deactivation since the presence of the carbon monoxide effectively reduces the tendency for the olefins to isomerize or for reverse displacement to occur.

Thus, in accordance with the improvement of the invention as described above, an increased yield of higher α-olefins may be obtained from a catalytic displacement reaction by inhibiting the reverse displacement reaction and isomerization to internal olefins.

It is also pointed out that after primary separation of the aluminum alkyls, as by inactivation (complexation), some trace amounts of aluminum alkyls and displacement catalyst may still remain in the olefins. If it is desired or necessary to store these olefins prior to further clean-up by water and/or caustic wash and distillation, such storage may involve the use of a carbon monoxide atmosphere for continued inhibition of isomerization.

The following examples will serve to further illustrate the improvement of this invention as described above.

Example 1

A simulated displacement reaction product was prepared by premixing a substantially pure straight chain $C_{12}$ 1-olefin and aluminum triethyl in a weight ratio of about 81/19, charging about 1500 g. of this mixture to a stirred autoclave, and pressuring the autoclave with ethylene to 500 p.s.i. while heating to about 150° F. Thereafter, 17 p.p.m nickel based on the total displacement product was added to the autoclave as nickel naphthenate in isooctane (6% Ni). The mixture was stirred at these conditions for several minutes to achieve homogeneity. A first sample of the mixture in the autoclave was then taken while the pressure and temperature conditions were maintained. The autoclave was then depressurized to about atmospheric pressure, which took several minutes, and a second sample of the mixture was taken. Thereafter, the mixture in the autoclave was continuously stirred and two additional samples were taken at subsequent time periods.

Each sample was drawn from the autoclave immediately into a dilute aqueous hydrochloric acid solution to inactivate the aluminum alkyls. The resulting mixture separated into an aqueous phase and an organic phase. The organic phase was decanted and analyzed by GLC for $C_{12}$ olefin and $C_{12}$ paraffin (the paraffin was formed by reverse displacement and inactivation of the aluminum alkyls) to indicate the extent of reverse displacement that had occurred. Analysis was also made by NMR to determine the $C_{12}$ olefin distribution in terms of α-olefins, internal olefins and pendant olefins.

The results of these analyses are indicated in the Table hereinafter.

Example 2

The procedure described in Example 1 was repeated except that before the first sample was taken and the autoclave was depressurized about 20 p.p.m. CO based on the total simulated displacement reaction product mixture was injected into the autoclave by pressuring with ethylene while mixing. The pressure in the autoclave was slightly increased due to this injection. The first sample was then drawn followed by depressurization and the remaining procedure was like that of Example 1 except the number and timing of samples varied. The results of the analyses are indicated in the Table.

Example 3

The procedure according to Example 2 was followed except that about 215 p.p.m. CO was injected and the number and timing of samples varied. The results appear in the Table.

Example 4

The procedure of Example 2 was again repeated except that about 4300 p.p.m. CO was injected and the timing of samples varied. The results appear in the Table.

TABLE

| Ex. No. | CO added (p.p.m.) | Sample time [a] | $C_{12}$ olefin conc. (wt. percent)[b] | $C_{12}$ olefin distribution (mol percent) | | |
|---|---|---|---|---|---|---|
| | | | | Alpha | Internal | Pendant |
| 1 | | Start | 97.4 | 94.4 | 4.2 | 1.4 |
| | | 5 min | 91.4 | 92.2 | 5.9 | 1.9 |
| | | 1 hr | 80.8 | 86.4 | 12.1 | 1.5 |
| | | 17 hrs | | 38.9 | 60.4 | 0.7 |
| 2 | 20 | Start | 98.3 | 91.7 | 7.1 | 1.2 |
| | | 85 min | 89.2 | 88.5 | 10.3 | 1.2 |
| | | 5 hrs | | 54.6 | 44.7 | 0.7 |
| 3 | 215 | Start | 97.6 | 95.8 | 3.5 | 0.7 |
| | | 6 min | 97.9 | 96.2 | 3.1 | 0.7 |
| | | 1 hr | 97.4 | 95.7 | 3.4 | 0.9 |
| | | 3 hrs | 88.0 | 93.3 | 6.7 | Trace |
| | | 17 hrs | | 85.4 | 13.7 | 0.9 |
| 4 | 4,300 | Start | 98.1 | 96.9 | 3.1 | Trace |
| | | 8 min | 98.1 | 96.1 | 3.4 | Trace |
| | | 1 hr | 97.6 | 95.6 | 3.6 | 0.8 |
| | | 3 hrs | | 93.6 | 5.8 | 0.6 |
| | | 17 hrs | 91.0 | 90.3 | 9.2 | 0.5 |

[a] Measured from time of first sample.
[b] (Wt. of $C_{12}$ olefin/wt. of $C_{12}$ olefin plus wt. of $C_{12}$ paraffin) × 100.

The above data readily demonstrates the effectiveness of carbon monoxide in reducing reverse displacement and olefin isomerization in accordance with the improvement of this invention.

Thus, having described the invention in detail, it will be understood by those skilled in the art that certain variations and modifications may be made without departing from the spirit and scope of the invention as described herein and in the appended claims.

I claim:
1. In a method for producing α-olefins by reacting a growth product containing aluminum trialkyls having 3 to 40 carbon atoms per alkyl group with a lower α-olefin at temperatures in the range of about 100° F. to 700° F. and at a pressure of at least 5 p.s.i.g. in the presence of a displacement catalyst to form a displacement product mixture comprising α-olefins having 3 to 40 carbon atoms and aluminum alkyls, depressurizing the displacement product mixture and separating α-olefins from the aluminum alkyls, the improvement therein of inhibiting reverse displacement and isomerization of the α-olefins to internal olefins in the displacement product mixture comprising injecting carbon monoxide to the displacement product mixture prior to separation of the aluminum alkyls.

2. A method according to Claim 1 wherein the carbon monoxide is injected prior to depressurizing the product mixture.

3. A method according to Claim 1 wherein the separated α-olefins are stored under a carbon monoxide atmosphere.

4. A method according to Claim 1 wherein carbon monoxide is employed in amounts ranging from about 10 p.p.m. to 5000 p.p.m. based on the total displacement reaction product mixture.

5. A method according to Claim 4 wherein the amounts range from about 100 p.p.m. to about 500 p.p.m.

6. A method according to Claim 1 wherein the aluminum alkyls are separated by inactivation of the aluminum alkyls forming an α-olefin phase and an aluminum alkyls phase followed by a phase split.

7. A method according to Claim 1 wherein the lower α-olefin is ethylene.

8. A method according to Claim 7 wherein the ethylene is maintained at a pressure in the range of about 5 p.s.i.g. to about 5000 p.s.i.g. during the displacement reaction and until after injection of the carbon monoxide.

9. A method according to Claim 8 wherein the carbon monoxide is injected under ethylene pressure.

References Cited

UNITED STATES PATENTS

| | | | |
|---|---|---|---|
| 3,657,301 | 4/1972 | Motz et al. | 260—448 A |
| 3,592,865 | 7/1971 | Long et al. | 260—677 A |
| 2,978,523 | 4/1961 | Cogne et al. | 260—683.15 D |
| 3,139,460 | 6/1964 | Eisenmann | 260—677 R |
| 3,206,522 | 9/1965 | Poe et al. | 260—683.15 |
| 3,499,057 | 3/1970 | Serratore | 260—683.15 |
| 3,280,025 | 10/1966 | Poe et al. | 208—322 |
| 3,437,713 | 4/1969 | Long | 260—681.5 p. |

HERBERT LEVINE, Primary Examiner

J. M. NELSON, Assistant Examiner

U.S. Cl. X.R.

260—448 A